United States Patent [19]

Muhoray

[11] 4,444,539
[45] Apr. 24, 1984

[54] APPARATUS FOR CLAMPING A RAILROAD CAR IN A ROTARY CAR DUMPER

[75] Inventor: Cornel Muhoray, Bay Village, Ohio
[73] Assignee: Dravo Corporation, Pittsburgh, Pa.
[21] Appl. No.: 365,907
[22] Filed: Apr. 6, 1982
[51] Int. Cl.³ .............................................. B65G 67/54
[52] U.S. Cl. ................................ 414/360; 92/165 PR; 414/763
[58] Field of Search .............. 414/360, 361, 372, 576, 414/678, 762, 763; 92/128, 165 PR; 269/93

[56] References Cited

U.S. PATENT DOCUMENTS

| 553,122 | 1/1896 | Long | 414/360 |
|---|---|---|---|
| 1,465,006 | 8/1923 | Simpson et al. | 414/576 |
| 3,081,066 | 3/1963 | Murawski | 254/93 R |
| 3,116,843 | 1/1964 | Clark | 414/361 |
| 3,232,459 | 2/1966 | Sabin | 414/360 X |
| 3,760,961 | 9/1973 | Haditsch | 414/361 |
| 3,777,914 | 12/1973 | Cheek et al. | 414/360 |
| 4,134,503 | 1/1979 | Baker | 414/372 |

Primary Examiner—Leslie J. Paperner
Attorney, Agent, or Firm—Parmelee, Miller, Welsh & Kratz

[57] ABSTRACT

A clamp for securing a railroad car in a rotary car dumper includes a guide pipe member mounted adjacent the section of track carried by the rotatable dumper frame, a clamp pipe member telescopically mated with the guide pipe member and a clamping jaw member extending laterally from the free end of the clamp pipe member toward the track section. Releasable coupling means in the form of a longitudinal slot in one pipe member which is engaged by a radially extending guide bar member tack welded or bolted to, or inserted in a slot in, the other pipe member permits the clamp pipe member to be extended and retracted relative to the guide pipe member by a coaxially mounted hydraulic cylinder while resisting rotational movement therebetween. If excessive torque is applied to the clamp pipe member, such as when the clamping jaw member is struck by a moving car, the guide bar member is sheared and the clamping pipe member rotates to swing the clamping jaw member out of the path of the car.

7 Claims, 5 Drawing Figures

U.S. Patent    Apr. 24, 1984    4,444,539
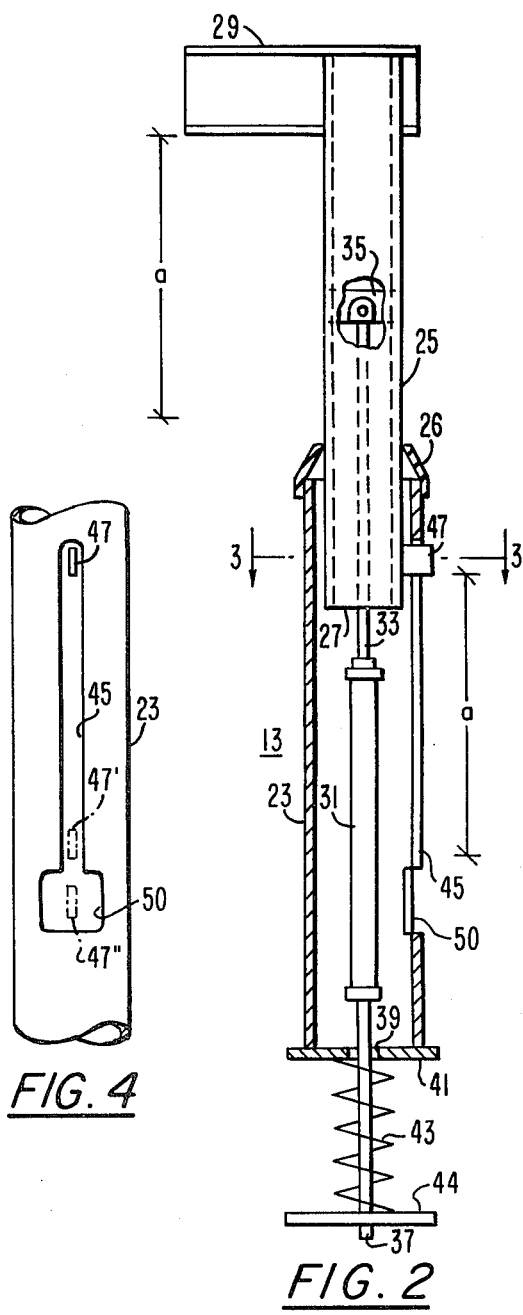
FIG. 4
FIG. 2
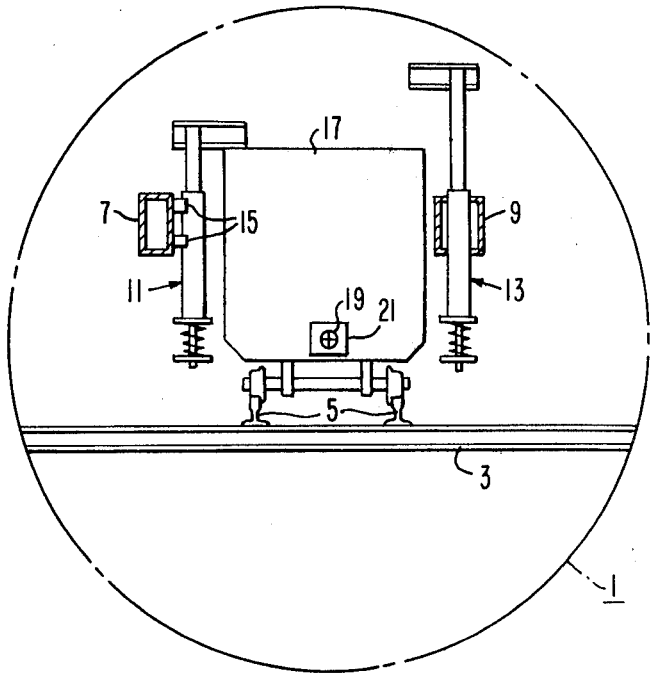
FIG. 1
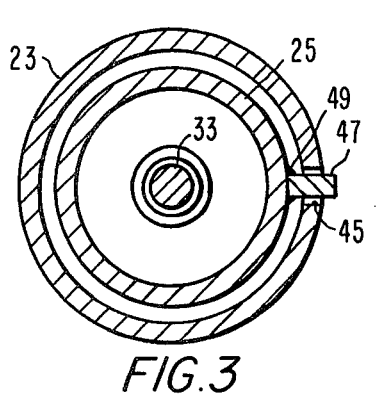
FIG. 3
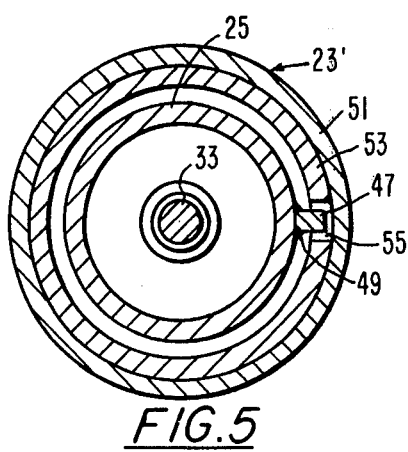
FIG. 5

APPARATUS FOR CLAMPING A RAILROAD CAR IN A ROTARY CAR DUMPER

FIELD OF THE INVENTION

This invention relates to clamps used to secure a railroad car to the tracks as the car is rotated to empty it of bulk material. More particularly, it is directed to such clamps which are provided with a shear point so that in the event that the clamp jaw is struck by a moving car, it will swing out of the way, thereby precluding extensive damage to the clamp or other parts of the car dumping apparatus.

PRIOR ART

Rotary car dumpers are in widespread use for dumping trainloads of bulk materials. The car dumper includes a section of track running longitudinally through a rotatable cylindrical frame. Clamps are provided at the four corners of the car to secure it to the tracks as it is being rotated about its longitudinal axis to dump the bulk material over one side. In some cases the cars are equipped with special rotatable couplings so that each car in a train can be sequentially rotated about its couplings for dumping without the need to disconnect it from the other cars as is required for cars not so equipped.

During the cyclic operation of the car dumper, the clamps are released to permit positioning of the next car, are then actuated to grip that car during dumping and are finally released again for repositioning of the train. Typically, the clamps are actuated by hydraulic cylinders which raise the clamp jaws during car maneuvering and lower them to exert pressure on the top edges of the cars during rotation for dumping. Should the hydraulic pressure fail while the cars are being positioned, the clamp jaw can fall down between the cars causing extensive damage to the jaws and adjacent structures as the advancing cars apply torque to the jaws. Destructive torque can also be generated where the jaws retract sufficiently to clear the hopper cars but do not fully retract so that they are contacted by the engine.

SUMMARY OF THE INVENTION

According to the present invention, the clamps which secure a railroad car in a rotary car dumper comprise a guide pipe member mounted on the rotatable frame adjacent to and generally perpendicular to the plane formed by the tracks, and a clamp pipe member telescopically mated with the guide pipe member. A clamping jaw member extends laterally from the clamp pipe member toward the track section to alternately release and clamp a railroad car positioned on the track section through extension and retraction of the clamp pipe member relative to the guide pipe member.

Releasable coupling means permits free longitudinal movement but resists rotational movement between the pipe members. The coupling means is oriented to align the clamping jaw member vertically with the edge of a car positioned on the track section, that is, with the clamping jaw member generally transverse to the longitudinal axis of the track section. The coupling releases, however, to allow the clamping pipe member to rotate relative to the guide pipe member so that the clamping jaw member swings toward a position generally parallel to the longitudinal axis of the track section should an excessive torque be applied to the clamping jaw member, such as would be generated should a car moving along the track section strike the clamping jaw member. With this arrangment, the clamping jaw member rotates out of the path of the moving car to a streamlined position so that permanent damage is not done to it or its supporting structure.

Preferably, the releasable coupling comprises a longitudinal slot in one of the pipe members and a guide bar member releasably secured to and extending radially from the other pipe member to slidably engage the slot. The guide bar member is sheared from the supporting pipe member should the torque applied to the clamping jaw member exceed preset limits.

With the guide bar member secured to the clamping pipe member and with the latter telescopically inserted into the guide pipe member, the guide bar member extends radially outward to engage the slot in the guide pipe member. When the guide bar member is tack welded or bolted to, or is inserted into a hole in the clamping pipe member, the longitudinal slot in the guide member can be provided with a circumferentially enlarged section at a point beyond the normal range of travel of the guide bar during extension and retraction of the clamping pipe member to permit access for welding, bolting, or inserting the guide member into a hole. This allows rapid resetting of the releasable coupling following a release.

As an alternative arrangement, the guide pipe member may include a guide pipe with a wear pipe fitted inside. The longitudinal slot then need only be provided in the replaceable wear pipe.

BRIEF DESCRIPTION OF THE DRAWINGS

FIG. 1 is a vertical section through a schematically represented rotary car dumper illustrating the relationship therewith of car clamping apparatus made in accordance with the teachings of this invention;

FIG. 2 is a side elevation view, with some parts cut away, of the car clamping apparatus illustrated in FIG. 1;

FIG. 3 is a cross-section through the car clamping apparatus of FIG. 2 taken along the line 3—3;

FIG. 4 is a side elevation view of a portion of the car clamping apparatus of FIG. 2 with other positions of the illustrated parts shown in dash-dot lines; and FIG. 5 is a section similar to that of FIG. 3 but taken through a modified form of the invention.

DESCRIPTION OF THE PREFERRED EMBODIMENTS

FIG. 1 illustrates a rotary car dumper which includes a cylindrical, rotatable frame shown schematically 1, which supports on beams 3 a section of railroad track 5 extending longitudinally through the cylindrical frame. The particular rotatable frame 1 illustrated also includes box or truss girders 7 and 9 extending longitudinally along the frame above, and laterally spaced on either side of, the tracks 5. Car clamping apparatus 11 and 13 according to the invention is mounted on these girders, or other suitable supports which locate the clamping apparatus on each side of the track section 5. Additional clamping apparatus, not shown, is provided on each side of the other end of the track section 5. As shown in the case of the unit 11, the clamping apparatus may be welded to brackets 15 which are secured to a girder such as 7, or it may be mounted through the girder as indicated by unit 13 and girder 9.

The clamping apparatus is operative between an open position as illustrated by the unit 13 which allows for positioning of a railroad car 17 on the tracks 5 and a clamping position as illustrated by the unit 11 in which the car 17 is firmly clamped in position on the track section 5. The rotatable frame 1 is of a length which accommodates one railroad car 17 and the clamping units are located near each end of the frame so that each corner of the railroad car is secured. With all of the clamping units clamping the railroad car 17, the frame 1 is rotated about its longitudinal axis 19 to dump bulk material over the side of the car. The track section 5 is located so that the axes of rotatable car couplings 21 on railroad car 17 are coextensive with the axis of rotation 19 of the rotatable frame 1. In this manner, as is well known in the art, successive railroad cars 17 of a train can be dumped without the need for uncoupling and recoupling the individual cars. For unloading cars which are not provided with rotatable couplings, it is not necessary that the axis of rotation of the rotatable frame pass through the car couplings since each car must be decoupled for dumping away. Of course, the frame 1 can be made longer so that two or more cars can be positioned and dumped simultaneously; however, in that case additional clamping units 11 and 13 must be provided so that each corner of each car can be secured.

The details of clamping apparatus 13 are illustrated in FIGS. 2 through 4. The apparatus includes a guide pipe member comprising a cylindrical section of pipe 23 and a clamp pipe member comprising a cylindrical section of pipe 25 having one end 27 which is telescopically mated with, and longitudinally slidable within, the pipe 23. A resilient annular collar 26 mounted on the end of pipe 23 provides a sliding seal between pipes 23 and 25 which prevents coal dust and other debris from lodging between the sliding parts. Extending laterally from the free end of pipe 25 is a clamping jaw member 29. The pipe 25 is extended and retracted with respect to the pipe 23 by a double acting hydraulic cylinder 31 mounted inside of pipe 23. The piston rod 33 of the hydraulic cylinder 31 extends axially along the pipe 25 and is secured thereto through a plate 35 extending diametrically through the pipe 25 at approximately the midpoint thereof. A rod 37 is fixed to the other end of cylinder 31 and extends axially therefrom through a hole 39 in an end plate 41 on the bottom of pipe 23. A compression type coil spring 43 mounted coaxially on rod 37 bears against the end plate 41 and a stop plate 44 secured to the free end of rod 37.

Releasable coupling means which permits free longitudinal movement between pipe members 23 and 25 but resists rotational movement therebetween, includes a slot 45 extending longitudinally along the pipe 23 and a guide bar member 47 which is secured to the internal pipe 25 and extends radially outward to engage the slot 45. The guide bar member 47 may be welded or bolted to, or inserted in a slot in, the internal pipe 25 and may alternatively be in the form of a pin or bolt instead of the rectangular shape illustrated. As shown in FIG. 3, the guide bar member 47 is tack welded to the pipe 25 with a weld 49 sized to shear when a predetermined torque is applied to the pipe 25. As the pipe 25 moves between the open position illustrated by unit 13 and the clamping position illustrated by unit 11 in FIG. 1, the clamping jaw member 29 travels the distance a. Simultaneously, the guide bar member 47 travels the distance, a, along the slot 45 to the position illustrated by the reference character 47'. In order to facilitate welding or otherwise securing the guide bar member to pipe 25, and rewelding or replacing it after a release, the slot 45 extends below the point reached by the guide bar member 47 when the clamping jaw member 29 is in contact with a railroad car, and terminates in an angularly wider opening 50. With no railroad car on the track section 5, the pipe 25 can be lowered until the portion to which the guide bar member is to be welded is aligned with the opening 50 and the guide bar is welded in place as indicated at 47". This arrangement also facilitates replacement of the guide bar member where it is bolted to or inserted in a slot in the internal pipe 25.

An alternate form of the invention is illustrated in FIG. 5. In this embodiment, the guide pipe member 23' includes a guide pipe 51 with an internally fitted wear sleeve 53. In this arrangement, a longitudinal slot 55 which is engaged by the guide bar member 47 tack welded to pipe 25 need only be provided in the wear sleeve 53. An opening located vertically at the same level as the opening 50 in FIGS. 2 and 4 could be provided through both the guide pipe 51 and wear sleeve 53 to facilitate replacement of the guide bar after a release.

In operation, the hydraulic cylinder 31 of each clamping unit is operated to raise the clamp pipe 23 to the open position illustrated by the unit 13. A railroad car is then positioned on the track section 5 and the hydraulic cylinder 31 is actuated to lower the pipe 25 until the clamping jaw 29 engages the top edge of the car. The frame 1 is then rotated to dump the bulk material from the car. As this occurs, the springs (not shown) on the railroad car tend to expand. If the connection between the pipes 23 and 25 was rigid, an undue stress would be placed on the clamping jaw member 29 and the hydraulic cylinder 31 as this occurs. However, since the hydraulic cylinder 31 is connected to the pipe 23 through spring 43, the stress generated by the tendency of the railroad car springs to expand upon dumping of the load is relieved by this flexible coupling. When the frame is rotated again to bring the car into the upright position shown in FIG. 1, the hydraulic cylinder 31 of each clamping unit is actuated to raise pipe 25 and clamping jaw member 29 to release the car.

Should hydraulic pressure be lost while the clamping unit is open for repositioning of the cars, the clamping jaw member can drop to a level where it can fall between the moving cars. This applies a large twisting moment to the clamping unit which could result in severe damage to the unit and its supporting structure. However, when the torque applied through pipe 25 to the coupling between pipes 23 and 25 reaches a predetermined level, the sacrificial guide bar member 47 is sheared from pipe 25, thereby allowing pipe 25 to turn freely to streamline the clamping jaw member 29 with the moving cars. Thus the clamping jaw member 29 is rotated from a position generally transverse to the track section 5 toward a position generally parallel thereto, thereby relieving the twisting moment applied to the clamping unit.

Such a release could also occur where the hydraulic cylinder 31 relaxes only partially, but the clamping jaw member drops sufficiently that it is struck by the engine of the train which is generally higher than the railroad cars.

Following correction of the hydraulic problem, the pipe 25 can be rotated back to the position shown in FIG. 1 where the clamping jaw member 29 extends toward the track section. Pipe 25 can then be lowered to the position discussed in connection with FIG. 4 so that the guide bar member 47 can be reconnected to the pipe 25 through opening 49.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

I claim:

1. Apparatus for clamping a railroad car in a rotary car dumper which includes a rotatable frame supporting a section of track, said apparatus comprising:
   a cylindrical guide pipe member mounted on said frame immovably fixed to the frame in a position generally perpendicular to the plane formed by the tracks and laterally spaced from the tracks;
   a cylindrical clamp pipe member having one end telescopically mated with said guide pipe member for longitudinal movement with respect thereto, and having a clamping jaw member extending laterally from the other end thereof;
   means for extending and retracting said clamp pipe member axially with respect to said guide pipe member to permit free movement of a car along the tracks when extended and to clamp the car to the tracks respectively when retracted; and
   releasable coupling means between said pipe members which permits free longitudinal movement of said pipe members relative to each other but which resists rotational movement therebetween, said means being oriented such that with said releasable means engaged said jaw member extends laterally in the direction toward and generally transverse to said tracks and being releasable to allow said clamp pipe member to rotate relative to the guide pipe member and rotate the jaw member toward a position generally parallel to the tracks without damage to the pipe members, the extending and retracting means or the jaw member when a force having a component of a predetermined magnitude in a direction generally parallel to said tracks is applied to said jaw member.

2. The apparatus of claim 1 wherein said releasable coupling means comprises a longitudinal slot in one of said pipe members and a guide bar member releasably secured to and extending radially from the other pipe member and slidably engaging said slot, said guide bar member being sheared from the other pipe member when a moving car strikes the jaw member.

3. The apparatus of claim 2 wherein said other pipe member telescopically mates inside said one pipe member with said guide bar member extending radially outward from said other pipe member.

4. The apparatus of claim 3 wherein said longitudinal slot in the one pipe member is enlarged in the circumferential direction at a selected point beyond the normal range of travel of the guide bar member as said clamp pipe member is extended and retracted with respect to the guide pipe member to provide access to secure said guide bar member to said other pipe member.

5. The apparatus of claim 3 wherein said one pipe member is the guide pipe member and the other pipe member is the clamp pipe member.

6. The apparatus of claim 5 wherein said guide pipe member comprises a guide pipe and a wear pipe fitted inside said guide pipe, said slot extending longitudinally along said wear pipe.

7. Apparatus for clamping a railroad car in a rotary car dumper which includes a rotatable frame supporting a section of track, said apparatus comprising: a clamping jaw, a telescopic support member fixed at its lower end to said rotatable frame and carrying at its upper end said clamping jaw with said jaw projecting laterally from the telescopic support member in a direction transverse to said track section to extend over the edge of a car positioned on the track section, means for extending and retracting said telescopic support member vertically between a retracted position in which the clamping jaw engages the edge of a car and clamps it to the track section and an extended position where it is clear of a car moving along the track section, and a releasable connection for maintaining the clamping jaw in said lateral position extending transversely over the track section while engaged, and should the telescopic member not be extended sufficiently so that the clamping jaw is impacted by a car moving along the track section, being releasable to rotate said clamping jaw relative to the lower fixed end of the telescopic support member toward a position generally parallel to the track section to allow said car to pass along the track section without any damaging force being applied to the clamping jaw, the telescopic support, the extending and retracting means of said frame.

* * * * *